United States Patent
Sepehri et al.

(10) Patent No.: US 10,451,727 B2
(45) Date of Patent: Oct. 22, 2019

(54) METHOD AND SYSTEM FOR DETECTING MOVING VEHICLE SPEED THROUGH A THIRD GENERATION PHOTO RADAR

(76) Inventors: Amirahmad Sepehri, Brussels (BE); Amirhossein Rezaei, Tehran (IR); Amir Shahmirzaei, Tehran (IR); Saeed Shamaghdari, Tehran (IR); Seyed Mehdi Hashemi Tashakori, Tehran (IR)

( * ) Notice: Subject to any disclaimer, the term of this patent is extended or adjusted under 35 U.S.C. 154(b) by 65 days.

(21) Appl. No.: 13/470,329

(22) Filed: May 13, 2012

(65) Prior Publication Data
US 2012/0286988 A1 Nov. 15, 2012

Related U.S. Application Data

(60) Provisional application No. 61/485,777, filed on May 13, 2011.

(51) Int. Cl.
*G01S 13/91* (2006.01)
*G01S 13/00* (2006.01)

(52) U.S. Cl.
CPC .................................. *G01S 13/91* (2013.01)

(58) Field of Classification Search
CPC .......... G01S 13/91; G01S 13/92; G08G 1/054
USPC .......... 342/52–58, 60, 61, 66, 104–115, 118, 342/146, 147, 175, 195, 59, 70; 701/1, 701/117, 118, 119; 340/933–943; 348/61, 143, 148, 149; 386/200, 201, 386/205, 224–229; 702/127, 142, 143
See application file for complete search history.

(56) References Cited

U.S. PATENT DOCUMENTS

| | | | | |
|---|---|---|---|---|
| 3,525,993 | A | * | 8/1970 | Szewczyk Zdzislaw, I et al. ....... 342/114 |
| 4,219,878 | A | * | 8/1980 | Goodson et al. ............. 342/115 |
| 4,717,915 | A | * | 1/1988 | Goede .................... G08G 1/054 342/106 |

(Continued)

FOREIGN PATENT DOCUMENTS

| | | | | |
|---|---|---|---|---|
| EP | 0528077 A1 | * | 2/1993 | ............. G01S 13/91 |
| EP | 0744630 A2 | * | 11/1996 | ............. G01S 13/91 |

(Continued)

OTHER PUBLICATIONS

E. Giaccari et al., "A Family of Air Traffic Control Radars"; IEEE Transactions on Aerospace and Electronic Systems; vol. AES-15, No. 3; May 1979; pp. 378-396. (Year: 1979).*

*Primary Examiner* — Bernarr E Gregory
(74) *Attorney, Agent, or Firm* — Barry Choobin; Patent 360

(57) ABSTRACT

The various embodiments herein provide a moving vehicle speed detection system for recording the speed violation. The system comprises third generation photo radar for determining an accurate speed of the moving vehicles by measuring a speed and also by measuring the speed with the help of an image processor. The speed of one or more vehicles moving in different lanes within the detection range of the system is accurately measured. The system has a traffic counter system and it can determine an average speed with a very high precision. Generally this system provides the operator with various directorial data and graphs which facilitates an intelligent management of traffic speed control. Also it can determine the accurate speed of any number of vehicles within the range of the system by a third generation photo radar system.

12 Claims, 3 Drawing Sheets

(56) References Cited

U.S. PATENT DOCUMENTS

| | | | | |
|---|---|---|---|---|
| 5,041,828 A * | 8/1991 | Loeven | | 340/937 |
| 5,381,155 A * | 1/1995 | Gerber | | G08G 1/054 |
| | | | | 340/936 |
| 5,408,330 A * | 4/1995 | Squicciarini et al. | | 386/205 |
| 5,491,464 A * | 2/1996 | Carter et al. | | 342/104 |
| 5,570,093 A * | 10/1996 | Aker et al. | | 342/104 |
| 5,677,979 A * | 10/1997 | Squicciarini et al. | | 386/224 |
| 5,691,724 A * | 11/1997 | Aker et al. | | 342/104 |
| 5,912,822 A * | 6/1999 | Davis et al. | | 342/104 |
| 5,935,190 A * | 8/1999 | Davis et al. | | 342/104 |
| 5,948,038 A * | 9/1999 | Daly et al. | | 342/66 |
| 6,008,752 A * | 12/1999 | Husk et al. | | 342/104 |
| 6,198,427 B1 * | 3/2001 | Aker et al. | | 342/114 |
| 6,249,241 B1 * | 6/2001 | Jordan et al. | | 342/59 |
| 6,266,627 B1 * | 7/2001 | Gatsonides | | 702/143 |
| 6,417,796 B1 * | 7/2002 | Bowlds | | 342/104 |
| 6,546,119 B2 * | 4/2003 | Ciolli et al. | | 382/104 |
| 6,970,102 B2 * | 11/2005 | Ciolli | | 348/149 |
| 7,038,614 B1 * | 5/2006 | Aker | | 342/70 |
| 7,049,999 B1 * | 5/2006 | Aker | | 342/114 |
| 7,057,550 B1 * | 6/2006 | Aker | | 342/104 |
| 7,068,212 B2 * | 6/2006 | Aker et al. | | 342/104 |
| 7,409,294 B2 * | 8/2008 | Mead et al. | | 342/104 |
| 7,633,433 B2 * | 12/2009 | Behrens et al. | | 342/109 |
| 7,864,102 B2 * | 1/2011 | Aker | | 342/107 |
| 8,442,749 B2 * | 5/2013 | Teffer et al. | | 701/117 |
| 8,692,690 B2 * | 4/2014 | Dalal | | 340/936 |
| 2003/0080878 A1 * | 5/2003 | Kirmuss | | 340/936 |
| 2010/0194622 A1 * | 8/2010 | Clingman et al. | | G01S 13/91 |
| 2011/0187580 A1 * | 8/2011 | Laenen et al. | | G01S 13/91 |

FOREIGN PATENT DOCUMENTS

| | | | | |
|---|---|---|---|---|
| FR | 2861468 A1 * | 4/2005 | | G01S 13/92 |
| FR | 2873480 A1 * | 1/2006 | | G01S 13/92 |

* cited by examiner

METHOD AND SYSTEM FOR DETECTING MOVING VEHICLE SPEED THROUGH A THIRD GENERATION PHOTO RADAR

CROSS-REFERENCE TO RELATED APPLICATION

This application claims the priority under 35 USC 119(e) of U.S. Provisional application Ser. No. 61/485,777, Filed May 13, 2011, which included by reference herein.

BACKGROUND

1. Technical Field

The embodiments herein generally relate to a speed detection system and particularly relate to a moving vehicle speed detection system. The embodiments herein more particularly relate to a method and system for detecting speed of moving vehicles by capturing an image of a moving vehicle through a third generation photo radar system.

2. Description of the Related Art

The system for recording a driving violation using a radar sensor has been marketed since 40 years. After the industrial revolution in 1980s known as information technology revolution, the speed camera detectors were introduced to the world. Since 20 years, these cameras have been common in Europe and they have been installed in the United States for last 10 years. Statistics have shown that the usage of speed camera detectors has helped in decreasing the accident rates by almost 30 percent.

The first generation of these driving violation recording systems was equipped with cameras, which traditionally were used to record the images since 1970s. The second generation of these driving violation recording systems has been marketed since 1990s. Previously, the short range radar systems were used for detecting the vehicle movements. The major and common problem of the previously used short range radar systems is that it was impossible to determine the speed of all the vehicles moving in different lanes within a sight or range of the radar system. To decrease these problems, the sight or range of the radar system was reduced by designing the rectangular antennas, which had totally different horizontal and vertical angles (50 and 20). Further, the speed detection system would automatically stop resulting in an error message, if two or more vehicles were simultaneously found within a range of the radar system. Therefore these systems were useless in the streets, roads and high traffic highways. However it was effective in the low traffic highways of Europe and the United States.

In the last 40 years, the environmental standards have changed because of the radar waves. A few years ago, the radar systems with an output radar radiations of 20 mW were only allowed to record the violations, while the previously designed short range radar systems actually doesn't have 20 mW output. However, the environmental regulations have been already changed and the radar systems with radar radiations having the maximum output power of 10 mW are allowed to record violations.

One of the prior arts provides a traffic enforcement system with a laser sensor to control the speed of a particular moving vehicle. In this prior art, the laser light is radiated to the moving vehicle for several times so that the speed of the moving vehicle is calculated by computing the time of the first and the last radiation in this system. According to the system, a speed measurement is carried out by detecting the distance between the consecutive laser radiations. The major drawback of this prior art is that the sensors easily get into trouble due to the usage of special invisible coating. Also the laser lights are useless during the night.

Another prior art provides a video sensor to measure the accurate speed of the moving vehicles. The video sensors are divided into two categories such as the one with visible light and the other with an infrared. The operation of the sensors in each category depends on a sequential shooting. It is found to be difficult in obtaining a proper exposure of the image of a moving vehicle. Because of the high speed of vehicles under detection, as well as changing conditions, the level of a light intensity of the moving vehicle can vary in a short period of time.

Hence there exists a need for a method and a system that overcomes the above mentioned drawbacks by providing a moving vehicle speed detection system for recording the speed violation. Further, there is a need for a third generation photo radar system for determining a speed and a direction of a moving vehicle. Further, there is also a need for a method and a system that determines the average speed of the moving vehicles by providing the various directional data and graphs, thereby facilitating an intelligent management of a traffic speed control.

The abovementioned shortcomings, disadvantages and problems are addressed herein and which will be understood by reading and studying the following specification.

OBJECT OF THE EMBODIMENTS

The primary object of the embodiments herein is to provide a moving vehicle speed detection system for recording a speed violation.

Another object of the embodiments herein is to provide a third generation photo radar system for determining a speed and a direction of one or more vehicles moving in different lanes.

Yet another object of the embodiments herein is to provide a method and a system for calculating a translation of moving vehicles and assigning the determined speed to the vehicle.

Yet another object of the embodiments herein is to provide a various directional data and graphs thereby facilitating an intelligent management of a traffic speed control.

These and other objects and advantages of the embodiments herein will become readily apparent from the following detailed description taken in conjunction with the accompanying drawings.

SUMMARY

The various embodiments herein provide a moving vehicle speed detection system for recording a speed violation. The moving vehicle speed detection system comprises a third generation photo radar system for measuring a speed and a direction of a plurality of moving vehicles, a digital camera for capturing an image of the plurality of moving vehicles, a central controller system for determining an accurate speed of the plurality of moving vehicles, a traffic counter system for measuring an average speed of the plurality of moving vehicles, an external memory for storing the captured image, a speed calculated along with a date and time stamp, a direction of the plurality of moving vehicles and a speed violation by one or more vehicles, a battery for providing an electrical power supply and one or more cooling fans for dissipating a heat. The moving vehicle speed detection system provides a pictorial data and graphs for managing a vehicle speed, and wherein the system determines an accurate speed of the plurality of moving vehicles in a sight range of the third generation photo radar system.

According to one embodiment herein, the third generation photo radar system for determining the speed and the direction of the plurality of the moving vehicles comprises a transmitter for generating electromagnetic waves, a radar antenna for beaming the generated electromagnetic waves towards the plurality of moving vehicles and receiving the reflected electromagnetic waves from the plurality of moving vehicles, a transmit switch for instructing the radar antenna with a transmit time for transmitting the generated electromagnetic waves, a receive switch for instructing the radar antenna with a receive time for receiving the reflected electromagnetic wave and a receiver for determining and amplifying the received reflected electromagnetic wave. The third generation photo radar system determines the speed and the direction of the plurality of moving vehicles by calculating a difference between a frequency of the generated electromagnetic wave and a frequency of the received reflected electromagnetic wave.

According to one embodiment herein, the central controller system for determining the accurate speed of the plurality of moving vehicles from the captured image comprises a detection system for determining a number of vehicles in the captured image, an internal memory for storing the captured images, a speed calculated along with a date and a time stamp, a direction of the plurality of moving vehicles and a speed violation by the plurality of moving vehicles temporarily and a Real Time Clock (RTC) for determining the date and the time stamp of a passage of the plurality of moving vehicles and assigning the determined date and the time stamp to a respective vehicle.

According to one embodiment herein, the digital camera captures an image of the plurality moving vehicles after receiving an image capture command from the central controller system, and wherein the digital camera offers high resolution images, zoom lens, a setting for a speed of shooting and a possibility of sequential shooting.

According to one embodiment herein, a general-purpose alternating current (AC) electric power supply is provided for supplying a required electrical power.

According to one embodiment herein, the moving vehicle speed detection system further comprises an Uninterruptible power supply (UPS) for avoiding an interruption in an operation during a sudden power outage, and wherein the UPS provides the required electrical power.

According to one embodiment herein, the moving vehicle speed detection system further comprises a plurality of solar plates connected in series to provide the required electrical power.

According to one embodiment herein, the moving vehicle speed detection system further comprises one or more temperature sensors for detecting a system temperature, and wherein one or more temperature sensors activates a cooling fan in case the detected system temperature crosses a threshold value, and wherein the threshold value for the system temperature is pre-configured.

According to one embodiment herein, the traffic counter system records the speed of the plurality of the moving vehicles, a date and a time stamp of the plurality of moving vehicles and stores the recorded speed of the plurality of moving vehicles in an external memory.

According to one embodiment herein, the determined speed and the direction of the plurality of moving vehicles are assigned to the respective moving vehicles by calculating a translation of a speed of the plurality of moving vehicles in the captured image.

According to one embodiment herein, the captured images from the digital camera are stored in a USB hard drive through the central controller system, and wherein the USB hard drive is removed when a memory in the hard drive is full and wherein stored images are sent to a main control center for necessary reviews and processing.

According to one embodiment herein, the traffic counter system calculates an average speed of the plurality of the moving vehicles daily, weekly, monthly and annually and stores the calculated average speed of the plurality of the moving vehicles daily, weekly, monthly and annually in an external memory.

According to an embodiment herein, a moving vehicle speed detection method is provided for recording a speed violation of the moving vehicles. The moving vehicle speed detection method comprising the steps of beaming an electromagnetic wave towards a plurality of moving vehicles, determining a speed and a direction of the plurality of moving vehicles, sending the determined speed and the direction of the plurality of moving vehicles to a central controller system, comparing the determined speed and the direction of the plurality of moving vehicles with a pre-set speed limit and an intended direction, sending an image capture command to the digital camera in case the determined speed and the direction exceeds the pre-set speed limit and the intended direction, capturing one or more images of the plurality of moving vehicles and assigning the determined speed and direction to the respective vehicle by calculating the translation of speed of the plurality of moving vehicles in the captured image.

According to one embodiment herein, the step of determining the speed and direction of the moving vehicles comprises the steps of generating an electromagnetic wave, transmitting the generated electromagnetic wave towards the plurality of moving vehicles, receiving a reflected electromagnetic wave from the plurality of moving vehicles, determining the reflected electromagnetic waves, amplifying the reflected electromagnetic waves, identifying a change in the frequency of the reflected electromagnetic waves and calculating a difference between a frequency of the generated electromagnetic waves and the a frequency of the reflected electromagnetic waves.

According to one embodiment herein, the step of determining the accurate speed of the plurality of moving vehicle from the captured image comprises the steps of receiving the determined speed and the direction of the plurality of moving vehicles from a third generation photo radar system, comparing the determined speed and direction of the plurality of moving vehicles with a pre-set speed limit and intended direction, sending an image capture command to a digital camera for capturing an image of the plurality of moving vehicle, capturing one or more images of the plurality of moving vehicles and storing the captured images of the plurality of moving vehicles in an internal memory.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
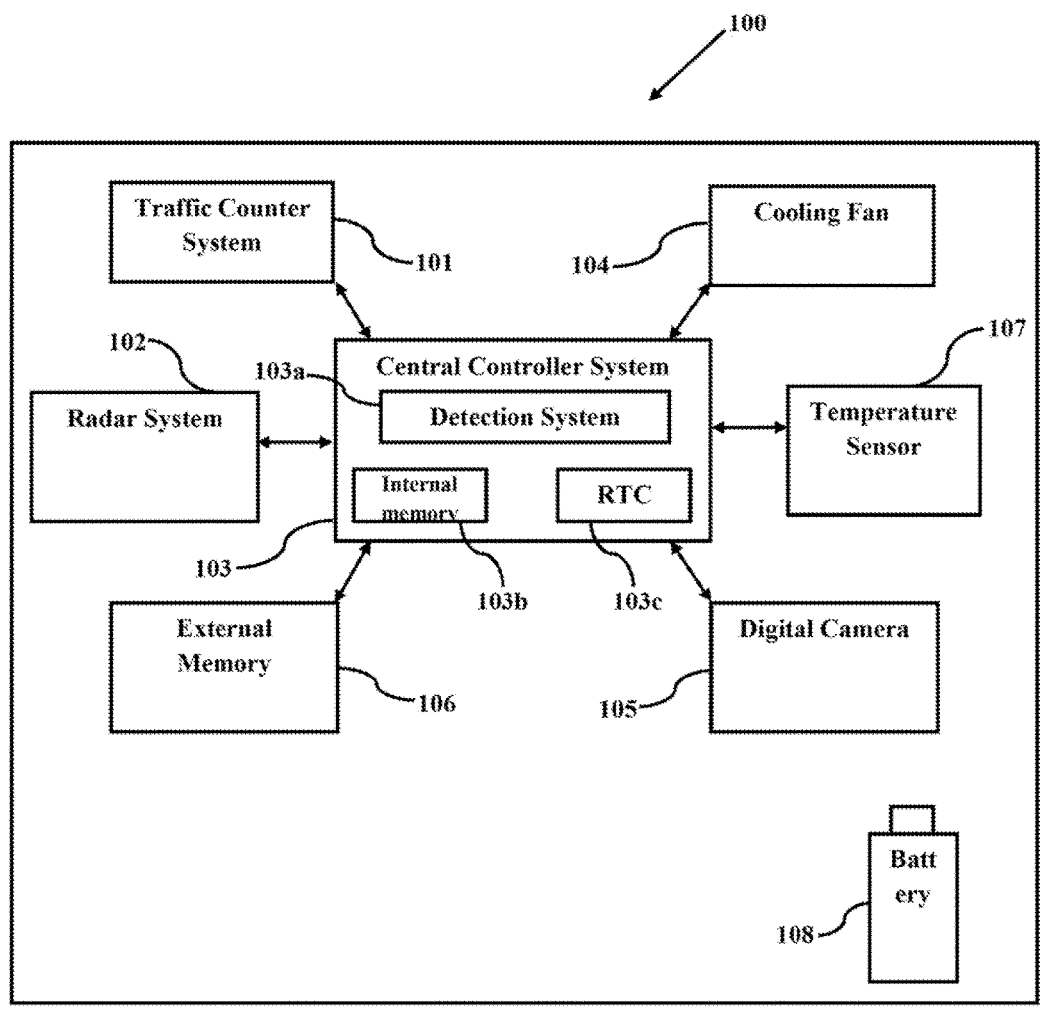
FIG. 1 illustrates a block diagram of a moving vehicle speed detection system for recording the speed violation, according to an embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a moving vehicle speed detection system for recording a speed violation. The moving vehicle speed detection system comprises a third generation photo radar system for measuring a speed and a direction of a plurality of moving vehicles, a digital camera for capturing an image of the plurality of moving vehicles, a central controller system for determining an accurate speed of the plurality of moving vehicles, a traffic counter system for measuring an average speed of the plurality of moving vehicles, an external memory for storing the captured image, a speed calculated along with a date and time stamp, a direction of the plurality of moving vehicles and a speed violation by one or more vehicles, a battery for providing an electrical power supply and one or more cooling fans for dissipating a heat. The moving vehicle speed detection system provides a pictorial data and graphs for managing a vehicle speed, and wherein the system determines an accurate speed of the plurality of moving vehicles in a sight range of the third generation photo radar system.

According to one embodiment herein, the third generation photo radar system for determining the speed and the direction of the plurality of the moving vehicles comprises a transmitter for generating electromagnetic waves, a radar antenna for beaming the generated electromagnetic waves towards the plurality of moving vehicles and receiving the reflected electromagnetic waves from the plurality of moving vehicles, a transmit switch for instructing the radar antenna with a transmit time for transmitting the generated electromagnetic waves, a receive switch for instructing the radar antenna with a receive time for receiving the reflected electromagnetic wave and a receiver for determining and amplifying the received reflected electromagnetic wave. The third generation photo radar system determines the speed and the direction of the plurality of moving vehicles by calculating a difference between a frequency of the generated electromagnetic wave and a frequency of the received reflected electromagnetic wave.

According to one embodiment herein, the central controller system for determining the accurate speed of the plurality of moving vehicles from the captured image comprises a detection system for determining a number of vehicles in the captured image, an internal memory for storing the captured images, a speed calculated along with a date and a time stamp, a direction of the plurality of moving vehicles and a speed violation by the plurality of moving vehicles temporarily and a Real Time Clock (RTC) for determining the date and the time stamp of a passage of the plurality of moving vehicles and assigning the determined date and the time stamp to a respective vehicle.

According to one embodiment herein, the digital camera captures an image of the plurality moving vehicles after receiving an image capture command from the central controller system, and wherein the digital camera offers high resolution images, zoom lens, a setting for a speed of shooting and a possibility of sequential shooting.

According to one embodiment herein, a general-purpose alternating current (AC) electric power supply is provided for supplying a required electrical power.

According to one embodiment herein, the moving vehicle speed detection system further comprises an Uninterruptible power supply (UPS) for avoiding an interruption in an operation during a sudden power outage, and wherein the UPS provides the required electrical power.

According to one embodiment herein, the moving vehicle speed detection system further comprises a plurality of solar plates connected in series to provide the required electrical power.

According to one embodiment herein, the moving vehicle speed detection system further comprises one or more temperature sensors for detecting a system temperature, and wherein one or more temperature sensors activates a cooling fan in case the detected system temperature crosses a threshold value, and wherein the threshold value for the system temperature is pre-configured.

According to one embodiment herein, the traffic counter system records the speed of the plurality of the moving vehicles, a date and a time stamp of the plurality of moving vehicles and stores the recorded speed of the plurality of moving vehicles in an external memory.

According to one embodiment herein, the determined speed and the direction of the plurality of moving vehicles are assigned to the respective moving vehicles by calculating a translation of a speed of the plurality of moving vehicles in the captured image.

According to one embodiment herein, the captured images from the digital camera are stored in a USB hard drive through the central controller system, and wherein the USB hard drive is removed when a memory in the hard drive is full and wherein stored images are sent to a main control center for necessary reviews and processing.

According to one embodiment herein, the traffic counter system calculates an average speed of the plurality of the moving vehicles daily, weekly, monthly and annually and stores the calculated average speed of the plurality of the moving vehicles daily, weekly, monthly and annually in an external memory.

According to an embodiment herein, a moving vehicle speed detection method is provided for recording a speed violation of the moving vehicles. The moving vehicle speed detection method comprising the steps of beaming an electromagnetic wave towards a plurality of moving vehicles, determining a speed and a direction of the plurality of moving vehicles, sending the determined speed and the direction of the plurality of moving vehicles to a central controller system, comparing the determined speed and the direction of the plurality of moving vehicles with a pre-set speed limit and an intended direction, sending an image capture command to the digital camera in case the determined speed and the direction exceeds the pre-set speed limit and the intended direction, capturing one or more images of the plurality of moving vehicles and assigning the determined speed and direction to the respective vehicle by calculating the translation of speed of the plurality of moving vehicles in the captured image.

According to one embodiment herein, the step of determining the speed and direction of the moving vehicles comprises the steps of generating an electromagnetic wave, transmitting the generated electromagnetic wave towards the plurality of moving vehicles, receiving a reflected electromagnetic wave from the plurality of moving vehicles, determining the reflected electromagnetic waves, amplifying the reflected electromagnetic waves, identifying a change in the frequency of the reflected electromagnetic waves and calculating a difference between a frequency of the generated electromagnetic waves and the a frequency of the reflected electromagnetic waves.

According to one embodiment herein, the step of determining the accurate speed of the plurality of moving vehicle from the captured image comprises the steps of receiving the determined speed and the direction of the plurality of moving vehicles from a third generation photo radar system, comparing the determined speed and direction of the plurality of moving vehicles with a pre-set speed limit and intended direction, sending an image capture command to a digital camera for capturing an image of the plurality of moving vehicle, capturing one or more images of the plurality of moving vehicles and storing the captured images of the plurality of moving vehicles in an internal memory.

FIG. 1 illustrates a block system diagram of the moving vehicle speed detection system for recording the speed violation, according to an embodiment herein. The moving vehicle speed detection system 100 for recording the speed violation comprises a traffic counter system 101, a third generation photo radar system 102, a central controller system 103, a temperature sensor 107, a digital camera 105, an external memory 106, a cooling fan 104 and a battery 108. The central controller system further comprises a detection system 103*a*, an internal memory 103*b* and a real-time clock (RTC) 103*c*.

According to an embodiment herein, the speed and direction of one or more vehicles moving in different lanes in the sight range of the moving vehicle speed detection system 100 is measured accurately. The output power of the third generation photo radar is changed to 10 mW. The third generation photo radar system 102 uses a Doppler Effect for determining the speed and direction of one or more moving vehicles in different lanes. The third generation photo radar system 102 generates the electromagnetic waves (preferably radio waves or micro waves) of a particular frequency and beams the generated electromagnetic waves towards the moving vehicles. As the generated electromagnetic waves strikes the moving vehicles, a small part of the generated electromagnetic waves are reflected back towards the third generation photo radar system 102 in the same direction. There will be a minor change in the frequency of the reflected electromagnetic waves, proportional to the speed and direction of the moving vehicles which is known as Doppler phenomena. The third generation photo radar system 102 determines the speed and direction of the moving vehicles by calculating the difference between the frequency of the generated electromagnetic wave and the frequency of the reflected electromagnetic wave. The third generation photo radar system 102 is capable of determining the speed and direction of ten moving vehicles per second.

According to an embodiment herein, the determined speed and direction of one or more moving vehicles are sent to the central controller system 103. The central controller system 103 acts as a processor. The central controller system 103 is responsible for managing the entire moving vehicle speed detection system 100. Once the speed and direction of one or more moving vehicles are received from the third generation photo radar system 102, the central controller system 103 compares the determined speed and direction of one or more moving vehicles with the pre-set speed limit and the intended direction. If the determined speed and direction exceeds the pre-set speed limit and the intended direction, the central controller system 103 sends an image capture command to the digital camera 105 for capturing the image of the moving vehicle.

According to an embodiment herein, the digital camera 105 captures the image of the moving vehicle. The captured image is sent to the detection system 103*a* of the central controller system 103. The detection system 103*a* determines whether the captured image comprises a single vehicle or a plurality of vehicles. If the captured image comprises a single vehicle, the digital camera 103 is automatically turned OFF. If the captured image comprises a plurality of vehicles, the central controller system 103 again sends the image capture command to the digital camera 105 for capturing a second image containing a plurality of vehicles.

According to an embodiment herein, a flash of the digital camera 105 is automatically turned OFF after the sunrise and similarly, the flash of the digital camera 105 is automatically turned ON before the sunset to get a better clarity of the captured images.

According to an embodiment herein, the moving vehicle speed detection system 100 comprises an internal memory 103*b* within the central controller system 103 and an external memory 106. The determined speed and direction of one or more moving vehicles along with the captured images, graphs etc are either stored in the internal memory 103*b* temporarily or in the external memory 106 permanently by the central controller system 103. The external memory 106 is a removable USB hard disk. Once the USB hard disk is full, the USB hard disk is removed from the moving vehicle speed detection system 100 and is replaced by an empty USB hard disk. The removed USB hard disk is sent to a main control center for necessary reviews and processing. Storing the number of images in the USB hard disk depends on the size of the memory space available in the USB hard disk. For Example: a 40 gigabyte sized USB hard disk can accommodate eighty thousand high quality images.

According to an embodiment herein, the determined speed and direction of one or more moving vehicles, the captured images, graphs etc are directly delivered to the main control center (remote computer) through a dedicated telephone line, or through an Internet and or through a radio transmitter. For this purpose, a separate folder called Radar is created in the main control center (remote computer) by a concerned authority. This main control center is connected to the system 100 through any of the dedicated telephone line or the Internet or the radio transmitter for transferring the determined speed and direction of one or more moving vehicles, the captured images, graphs etc from the system 100 to the main control center (remote computer). If there is no sufficient space in the memory, transferring the determined speed and direction of one or more moving vehicles, the captured images, graphs etc is not activated. The concerned authority is facilitated to access the determined speed and direction of one or more moving vehicles, the captured images, graphs etc, stored in the internal memory or the external memory or the main control center.

According to an embodiment herein, the translation of one or more moving vehicles are relatively calculated for assigning the speed and direction reported by the third generation photo radar system 102 to the respective vehicle. After calculating the translation, the maximum speed is assigned to the respective vehicle having the most translation and the minimum speed to the vehicle having the least translation through an algorithm. For Example, if the speeds reported by the third generation photo radar system 102 are 102, 78, 124 and 95 and the translations are 10.35, 6.51, 8.51 and 7.93, the speed of 124 will be assigned to the vehicle having the most translation of 10.35 meters by the algorithm. Similarly 102 is assigned to the vehicle having the translation of 8.51 meters, 95 is assigned to the vehicle with the translation of 7.93 meters and 78 is assigned to the vehicle with the least translation of 6.51 meters. So the speed of all the vehicles existing in the captured images is calculated accurately with the radar accuracy, which is almost 0.1 meter per second.

According to an embodiment herein, the speed of the vehicles existing in the captured images is found by calculating the time period between two consecutive shootings (digital camera shootings). In this method, the maximum speed is obtained by calculating the maximum translation and having the time intervals between two consecutive images. Knowing that the obtained time is equal for all the vehicles and also by having the translation of each vehicle, the speed of all the moving vehicles is calculated. According to the time interval, which is always constant, between the captured images and translation which is calculated by a very accurate third generation photo radar system 102, the speed of all the moving vehicles is calculated accurately.

According to an embodiment herein, the moving vehicle speed detection system 100 comprises a temperature sensor 107 to detect the temperature. The temperature sensor 107 is connected to the central controller system 103. A temperature limit is set in the central controller system 103. If the current temperature within the system 100 exceeds the pre-set temperature limit, the temperature sensor 107 instructs the central controller system 103 to turn ON a cooling fan 104. As the temperature inside the system 100 reduces, the cooling fan 104 is automatically turned OFF by the central controller system 103.

According to an embodiment herein, the cooling fan 104 is turned ON or OFF manually by a dedicated switch provided in the moving vehicle speed detection system 100.

According to an embodiment herein, the central controller system 103 further comprises a real time clock (RTC) 103c. The RTC 103c determines the date and time of the passage of all the moving vehicles and stores the determined date and time of the respective vehicles either in the internal memory 103b or in the external memory 106.

According to an embodiment herein, the traffic counter system 101 of the embodiments herein keep a track of one or more moving vehicles along with the time stamp and the determined speed and directions of all the moving vehicles are stored either in the internal memory 103b or in the external memory 106. The traffic counter system 101 records the speed, time and date of the passage of a plurality of moving vehicles and also calculate the traffic average speed either daily or weekly or monthly or annually.

According to an embodiment herein, the moving vehicle speed detection system 100 determining the speed of a plurality of vehicles moving in different lanes is powered by a battery 108. The battery 108 is either charged by an AC power or is equipped with lithium-ion batteries.

According to an embodiment herein, the moving vehicle speed detection system 100 further comprises a plurality of solar panels connected in series for generating electrical power from the solar radiation. The plurality of solar panels is connected to a set of batteries for storing generated electrical power. The set of batteries are further connected to the system 100 of the embodiments herein for powering up the system 100.

According to an embodiment herein, an Uninterruptible Power Supply (UPS) is provided to power up the moving vehicle speed detection system 100 to avoid interruption in the system 100 work in case of sudden power outage.

According to an embodiment herein, the central controller system 103 acts as an Embedded Web Server. Therefore the connection between a notebook and the third generation photo radar system 102 is provided through Wireless connectivity.

According to an embodiment herein, the settings of the moving vehicle speed detection system 100 such as setting an illegal speed, setting the direction of the moving vehicle, setting the time of system's flash and observing the remaining part of the system's memory through Internet Explorer is only possible through having the address and password.

According to an embodiment herein, the moving vehicle speed detection system 100 illustrates the speed of the moving vehicles with illegal speed by a specific color and the speed of the moving vehicles with an assured speed by a specific color. For example, the speed of the moving vehicles with an illegal speed is indicated by a red color and the speed of the moving vehicles with an assured speed is indicated by a green color. The system 100 also provides an alarm incase of dangerous speeds.

Figure 2:
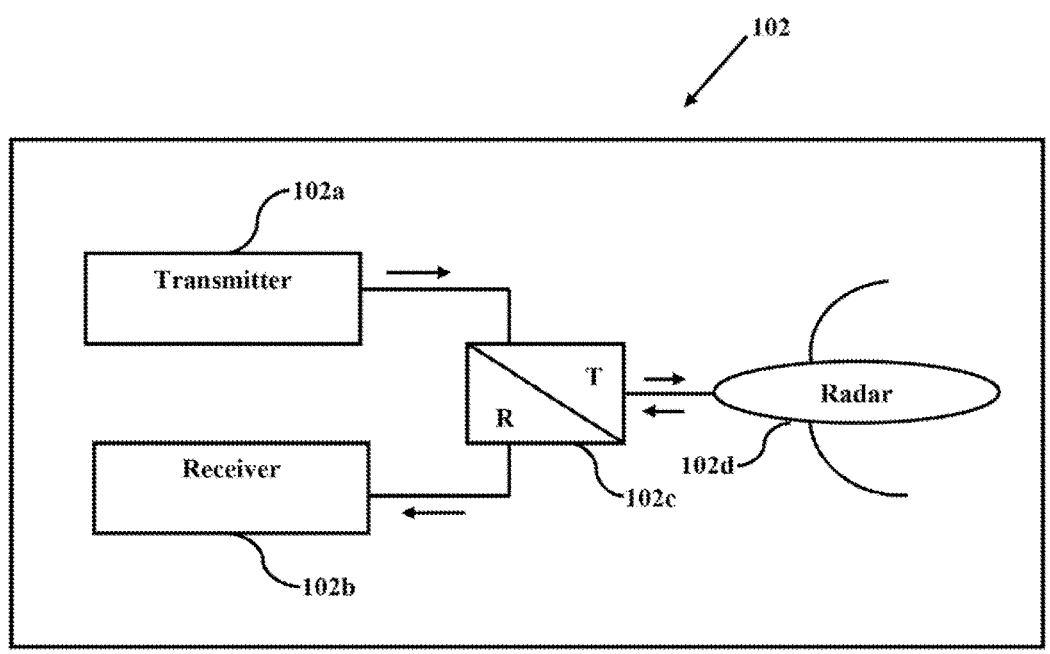
FIG. 2 illustrates a block diagram of a third generation radar system for determining the speed of one or more vehicles moving in different lanes, according to an embodiment herein.

FIG. 2 illustrates a block diagram of a third generation radar system for determining the speed of one or more vehicles moving in different lanes, according to an embodiment herein. The third generation photo radar system 102 comprises a transmitter 102a, a receiver 102b, a transmitter/receiver switch 102c and a radar antenna 102d.

The third generation photo radar system 102 of the embodiments herein uses a Doppler Effect in determining the speed and direction of one or more moving vehicles. The transmitter 102a generates the electromagnetic waves (preferably radio waves or micro waves) of a particular frequency. The radar antenna 102d beams the generated electromagnetic waves towards the moving vehicle. A small part of the generated electromagnetic waves are reflected back towards the radar antenna 102d in the same direction. A minor change in the frequency of the reflected electromagnetic wave is noticed in proportional to the speed and direction of the moving vehicles which is known as Doppler phenomena. The reflected electromagnetic wave is received by the radar antenna 102d. Though the reflected electromagnetic waves are generally weaker than the generated electromagnetic waves, the receiver 102b detects the reflected electromagnetic waves and amplifies the reflected electromagnetic waves. The third generation photo radar system 102 measures the speed and direction of the moving vehicles by calculating the difference between the frequency of the generated electromagnetic wave and the frequency of the reflected electromagnetic wave. The purpose of the transmitter/receiver switch 102c of the third generation photo radar system 102 is to instruct the radar antenna 102d with a time to transmit the generated electromagnetic wave and a time to receive the reflected electromagnetic wave.

Figure 3:
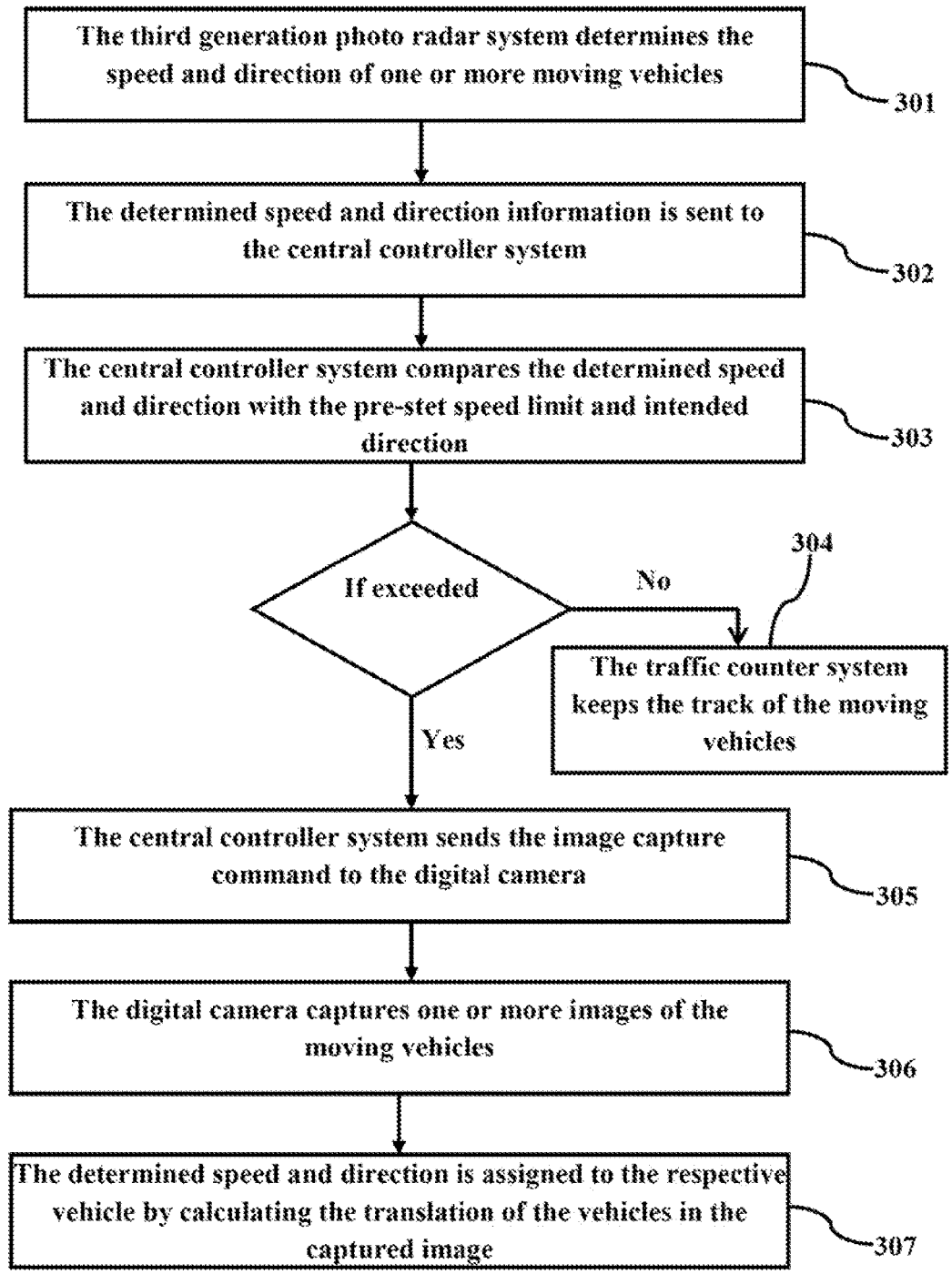
FIG. 3 illustrates a flow chart explaining the method for determining the speed and direction of one or more moving vehicles, according to an embodiment herein.

FIG. 3 illustrates a flow chart indicating a method of determining the speed and direction of one or more moving vehicles, according to an embodiment herein. The third generation photo radar system generates the electromagnetic waves (preferably radio waves or micro waves) of a particular frequency and beams the generated electromagnetic waves towards the moving vehicles. As the generated electromagnetic waves strikes the moving vehicle, a small part of the generated electromagnetic waves is reflected back towards the third generation photo radar system in the same direction. There will be a minor change in the frequency of the reflected electromagnetic waves in proportional to the speed and direction of the moving vehicles. The third generation photo radar system determines the speed and direction of the moving vehicles by calculating the difference between the frequency of the generated electromagnetic wave and the frequency of the reflected electromagnetic wave (301). The determined speed and direction of one or more moving vehicles are sent to the central controller system (302). The central controller system acts as a processor. The central controller system is responsible for managing the entire system. After the speed and direction of one or more moving vehicles are received from the third generation photo radar system, the central controller system compares the determined speed and direction with the pre-set speed limit and the intended direction (303). If the determined speed and direction does not exceed the pre-set speed limit and the intended direction, the traffic counter system keeps track of the moving vehicles (304). If the determined speed and direction exceeds the pre-set speed limit and the intended direction, the central controller system sends an image capture command to the digital camera (305). The digital camera captures the image of the moving vehicles (306). The captured image is sent to the central controller system. The central controller system determines whether the captured image comprises a single vehicle or a plurality of vehicles. If the captured image comprises a single vehicle, the digital camera is automatically turned OFF. If the captured image comprises plurality of vehicles, the central controller system again sends an image capture command to the digital camera. For assigning the speeds reported by the third generation photo radar system to the respective vehicle, the translation of one or more moving vehicles is relatively calculated. Once the translation of one or more moving vehicles is calculated, the maximum speed is assigned to the respective vehicle which had the most translation and the minimum speed to the vehicle which had the least translation through an algorithm (307).

The third generation photo radar of the embodiments herein determines the speed of a plurality of vehicles moving in different lanes more accurately. This method is desirable because of some reasons such as overlapping of the moving vehicles, the number of the vehicles does not equate the number of speeds read by the third generation photo radar system. So this method can help us to calculate the speed of all moving vehicles by having the maximum speed.

According to the lens and camera laws, in finding the translation of the vehicles in two consecutive images, the focal length of lens and the width of CCD represent an angle, which is called a camera-viewing angle. This angle represents the vision depth of the digital camera in different distances. In other words, the distance between the digital camera and the intended place is calculated through the amount of vision depth and camera viewing angle. For calculating the digital camera angle, it is necessary to have CCD width and lens focal distance. For example the CCD width for digital SLR cameras is about 22.2 millimeter. For a focal point of 100 millimeter and type of CCD (Digital SLR), a=12.67. This amount has been used in third generation photo radar system.

At first the pixel size of width of plate in image's virtual world is measured (PPW: Plate Pixel Width) to calculate the distance between the digital camera and the vehicle. This pixel size is equal to the width of the plate in meter in real world (PMW: Plate Metric Width). Now the number of plates situated in the image is calculated by considering the pixel size of a plate having the size of the image in pixel (IPW: Image Pixel Width). By multiplying the obtained number in (PMW) vision depth of digital camera, the distance between the digital camera and the vehicle's plate can be calculated (DV: Depth of View). Then the distance between the digital camera and the vehicle's plate (VD: Vehicle Distance) is obtained according to the camera-viewing angle.

In the method of finding the translation of the vehicle, it is enough to calculate the distance between the vehicle and the digital camera for the first and second images and then the translation of the vehicle between two consecutive images can be calculated by subtracting these two amounts. If the digital camera angel is a big number, then the multiply of cos(a/2) in VD will have a great difference, so the pixel size of plate wouldn't be equal in different lines and the mentioned relations can be used anymore, because it is assumed that the pixel size of plate is equal in an imaginary line.

A calculation error in viewing angle of a=12.6, and cos(a/2)=0.994 is very low, near zero. In other words it can be assumed that plates are equal to each other in an imaginary line perpendicular to the viewing rout of the digital camera. Because the distance between the digital camera and the vehicle will be nearly equal in all the three lines. And this error will be because of the impossibility of line change by the vehicle in a time interval less than 500 millisecond and use of two distances subtraction will be reduced to the possible minimum.

According to an embodiment herein, the moving vehicle speed detection system is further capable of setting the direction of the third generation photo radar system. The direction of third generation photo radar system is defined and adjusted.

According to an embodiment herein, a shooting command is issued when the speed of the moving vehicles approaching the moving vehicle speed detection system from the opposite direction is illegal. During night, this mode is not used because of flashlight, which might strike the driver's eyes except in the special circumstances.

According to an embodiment herein, a shooting command is issued, when the speed of the moving vehicles getting away from the moving vehicle speed detection system is illegal.

According to an embodiment herein, a shooting command is issued, if the speed of the moving vehicles approaching towards the moving vehicle speed detection system as well as getting away from the moving vehicle speed detection system is illegal (This mode is applied in bilateral roads). In such cases, the horizontal angle of the third generation photo radar system and the road is adjustable. The vertical angle of the third generation photo radar system and the road is adjustable. The minimum reflection (this number is the reflection limit value of the third generation photo radar system) is adjustable. So the shooting permission will be issued, if the return reflection of third generation photo radar system is more than defined limit and the speed is recognized as illegal. Otherwise no image is captured.

According to an embodiment herein, the latency of the digital camera can be defined. This delay time is in seconds, a number between 0 and 9 represents shooting intervals between two different events. The digital camera can also be manually get turned ON and OFF.

According to an embodiment herein, the number of commands stored in the internal memory represents the number of commands sent to the digital camera, and the number of images taken by the digital camera is extracted.

According to an embodiment herein, the data transferring system comprising two modes of Move and Copy transfer. Generally transferring takes place in Move mode, in a way by pressing the image transfer key in the image part (transferring through USB drive); the images will be deleted from the memory of the system. But if only images needed to be copied, this key should be in Copy mode.

According to an embodiment herein, the size of the image, which is seen in image frame of the program, can be changed. If the image is larger than the current frame, scroll bar will get activated automatically. (For the medium mode, this number is nearly 7.4).

According to an embodiment herein, the quality of the captured images can be selected. JPEG compression percentage can be selected which the number of 750 of the JPEG is a highly qualified image. The less is this number comparing to 750, the compression percentage would be less so the size of saved photo would decrease.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

What is claimed is:

1. A speed detection system for recording a speed violation of moving vehicles, the system comprising:
    a photo radar system for measuring a speed and a direction of each vehicle amongst a plurality of moving vehicles;
    a digital camera for capturing at least one image of each vehicle amongst the plurality of moving vehicles;
    a central controller system for determining an accurate speed of each of the plurality of moving vehicles;
    a traffic counter system for measuring an average speed of the plurality of moving vehicles;
    an external memory for storing the captured image, the determined speed along with a time stamp, the direction of each of the plurality of moving vehicles and information corresponding to speed limit violations performed by each of the vehicles, amongst the plurality of vehicles;
    a battery for providing an electrical power supply; and
    at least one cooling fan for dissipating a heat;
    wherein the central controller system is configured to manage vehicle speed based on the captured image and the direction of each of the plurality of moving vehicles, and wherein the central controller system is configured to determine the accurate speed of each vehicle amongst the plurality of moving vehicles, when the plurality of moving vehicle(s) are within a range of the photo radar system.

2. The system according to claim 1, wherein the photo radar system further comprises:
    a transmitter for generating electromagnetic waves;
    a radar antenna for beaming the generated electromagnetic waves towards the plurality of moving vehicles and receiving the electromagnetic waves reflected from each of the plurality of moving vehicles;
    a transmit switch for instructing the radar antenna with a transmit time for transmitting the generated electromagnetic waves;
    a receive switch for instructing the radar antenna with a receive time for receiving the reflected electromagnetic wave; and
    a receiver for receiving the electromagnetic waves reflected from each of the plurality of moving vehicles, said receiver configured to amplify the received reflected electromagnetic wave;
    wherein the photo radar system determines the speed and the direction of each of the plurality of moving vehicles by calculating a difference between the frequency of the generated electromagnetic wave and the frequency of the respective reflected electromagnetic wave.

3. The system according to claim 1, wherein the central controller system for determining the accurate speed of each of the plurality of moving vehicles comprises:
    a detection system for determining the number of vehicles captured in the image;
    an internal memory for storing the captured images, the determined speed corresponding to each of the vehicles along with the corresponding time stamp, direction of each of the plurality of moving vehicles and information corresponding to speed violations performed by each of the plurality of moving vehicles, at least temporarily; and
    a Real Time Clock (RTC) for determining the date and the time stamp corresponding to the movement of each of the plurality of vehicles.

4. The system according to claim 1, wherein the digital camera captures an image of each of the plurality of moving vehicles after receiving an image capture command from the central controller system, and wherein the digital camera offers high resolution images, zoom lens, an option for setting the speed of shooting and an option of sequential shooting.

5. The system according to claim 1, wherein a general purpose alternating current (AC) electric power supply is provided for supplying a required electrical power, to the system.

6. The system according to claim 1 further comprises at least one temperature sensor for detecting a system temperature, and wherein said temperature sensor activates the atleast one cooling fan in case the detected system temperature crosses a threshold value, and wherein the threshold value for the system temperature is pre-configured.

7. The system according to claim 1, wherein the traffic counter system records the speed of each of the plurality of the moving vehicles, a time stamp corresponding to each of the plurality of moving vehicles and stores the recorded speed of each of the plurality of moving vehicles, in an external memory.

8. The system according to claim 1, wherein the determined speed and the direction of each of the plurality of moving vehicles are assigned to the respective moving vehicles by calculating a translation of a speed and direction of each of the plurality of moving vehicles in the captured image.

9. The system according to claim 1, wherein the captured images from the digital camera are stored in a Universal Serial Bus (USB) hard drive through the central controller system, and wherein the USB hard drive is removed when a memory in the hard drive is full and wherein stored images are sent to a main control center for reviews and processing.

10. The system according to claim 1, wherein the traffic counter system calculates an average speed of the plurality of the moving vehicles daily, weekly, monthly and annually and stores the calculated average speed of the plurality of the moving vehicles in an external memory.

11. A speed detection method for recording speed violations of moving vehicles, the method comprising the steps of:
beaming an electromagnetic wave towards a plurality of moving vehicles;
determining the speed and direction of each of the plurality of moving vehicles;
transmitting the information corresponding to the determined speed and the direction of each of the plurality of moving vehicles, to a central controller system;
comparing the determined speed and the direction of each of the plurality of moving vehicles with a preset speed limit and predefined direction;
sending an image capture command to a digital camera in case the determined speed exceeds the pre-set speed limit and the direction is not the same as the intended direction;
capturing images of the moving vehicles whose determined speed is in excess of the predefined speed limit and the direction is other than the predefined direction; and
assigning the determined speed and direction to respective vehicles by calculating the speed and direction of said moving vehicles.

12. The method according to claim 11, wherein the step of determining the speed and direction of each of the moving vehicles comprises the steps of:
generating an electromagnetic wave;
transmitting the generated electromagnetic wave towards the plurality of moving vehicles;
receiving a reflected electromagnetic wave from each of the plurality of moving vehicles;
amplifying the reflected electromagnetic waves;
identifying a change in the frequency of the reflected electromagnetic waves; and
calculating a difference between the frequency of the generated electromagnetic waves and the frequency of the reflected electromagnetic waves, thereby determining the speed and direction of travel of each of the plurality of moving vehicles.

* * * * *